J. H. Myers Harvester
№ 3493
Reissued
Jun 8 1869
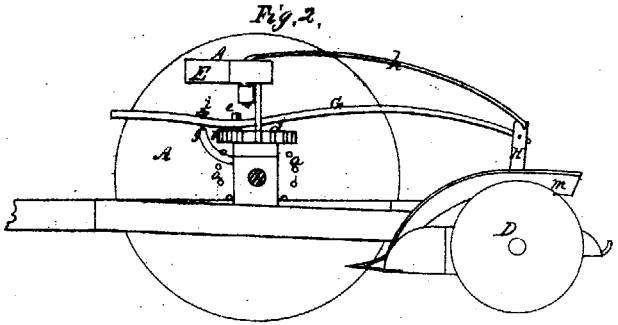
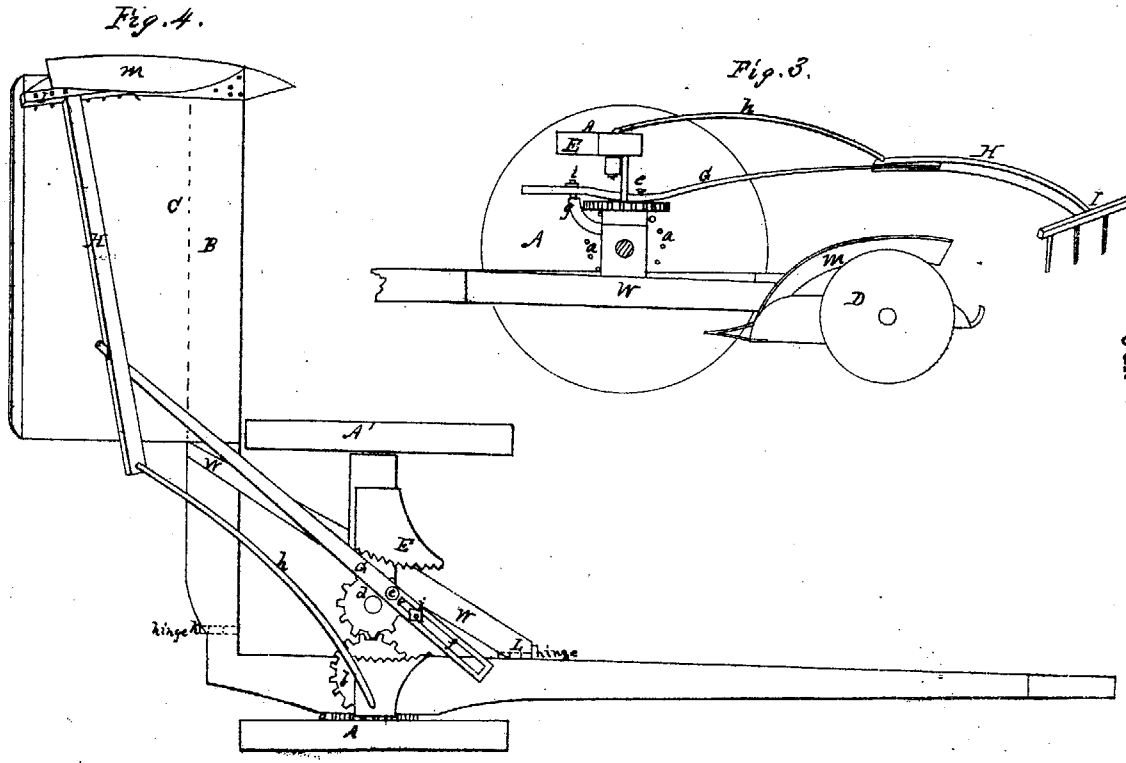
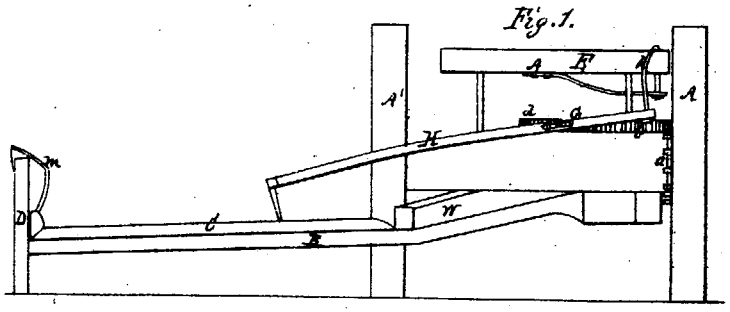
Witnesses
N B Smith
Alex Mabon
Inventor
J. H. Myers, assignor
by Ann Rankin Atty

UNITED STATES PATENT OFFICE.

J. H. MYERS, OF PHILADELPHIA, PA., ASSIGNEE OF COLLINS B. BROWN.

IMPROVEMENT IN HARVESTERS.

Specification forming part of Letters Patent No. 11,249, dated July 11, 1854; extended seven years; Reissue No. 3,493, dated June 8, 1869.

DIVISION A.

*To all whom it may concern:*

Be it known that COLLINS B. BROWN, of Upper Alton, county of Madison, and State of Illinois, did invent certain new and useful Improvements in Grain and Grass Harvesters, of which the following is a full, clear, and exact description, reference being had to the accompanying drawing, in which—

Figure 1 is a rear elevation; Figs. 2 and 3, side elevations, with the inner main carrying-wheel removed; and Fig. 4, a plan or top view of a harvesting-machine constructed in accordance with said invention.

Similar letters of reference denote corresponding parts in the several figures.

The invention relates to a machine adapted to be used for mowing grass and for reaping grain, and, when used for the latter purpose, is provided with a platform and an automatic rake for discharging the grain from said platform upon the ground in convenient quantities for binding.

The nature of said invention or improvement will be best understood from the following description.

In the accompanying drawings, A A′ represent the main carrying-wheels, mounted upon a common axle. B is the finger-bar. K L are adjustable hinges, which connect the finger-bar with the main frame in such manner as to adapt the finger-bar to follow the uneven surface of the ground when the machine is used for cutting grass.

The hinge K is arranged in the same transverse line, or thereabout, with the heel of the finger-beam, and in rear of or upon one side of the axle, while hinge L connects the outer end of an oblique or diagonal brace, W, with the frame upon the opposite side of the axle, and nearly in line longitudinally with the hinge K, as shown in Fig. 4. By this arrangement of hinges, in connection with brace W, a strong and sufficient support is given to the finger-beam, to enable it to be projected laterally from the frame, and upon the inner or grain side of the inner main wheel A′.

When the machine is to be used for cutting grain, the inner or heel end of the finger-beam is adjusted to the desired height by the adjustment of hinges K and L, or that portion of said hinges or hinge-plates which is secured to the frame, said portion being made adjustable or adapted to be inverted for that purpose.

The outer end of the finger is held at the required height by a small carrying or grain wheel, D, supported by or connected with the outer shoe or divider.

A platform, C, is applied in reaping, and is connected with the finger-bar B, in position represented in Figs. 1 and 4, to receive the grain as it is cut, and a shield, *m*, attached to the divider or outer shoe, serves to deflect the falling grain inward upon the platform, so as to bring it within the reach and action of the rake.

H is the rake-arm, and I the rake-head, attached to the outer end of said arm. The inner end of the rake-arm H is jointed, or connected by a swinging arm or link, *h*, with a pivotal point of support, which is fixed relatively to the platform.

G is a connecting-rod or pitman, pivoted at one end to the rake-arm, and provided at its opposite end with an elongated slot, *f*, through which a pin or stud, *i*, on a stationary support, *g*, passes, the rod G being secured or held in place on pin *i*, by a nut, in such manner as to permit it, through the slot *f*, to move freely back and forth, and to turn upon said pin as a fulcrum. *e* is a crank-pin for operating the connecting-rod G, applied to a horizontal spurred or toothed crank-wheel, *d*, which is operated through transmitting-wheel *b* from the main drive-wheel A.

The point of connection of the crank *e* with rod G is between the rake-head and fulcrum or pivot *i*.

The operation of the rake will be readily understood. Arm or link *h* and rod G, in connection with the rake-arm H, and a line drawn from crank *e* to the fixed pivot of arm *h*, form, as represented in Fig. 4, the bars and links of a parallel rule, but the fulcrums or centers of movement being fixed, one located at the end of bar *h*, and a second near the crank-pin, and at the corresponding end of the other bar G, a swinging movement is given to the opposite ends, carrying the rake-arm, and the rake-head attached to the extended arm thereof is made to describe an elliptical path or one approximating thereto.

The rising and falling movements of the rake are given by means of a bend in the slotted end of arm G. The height of the two points of support of said arm—viz., pivot *i* and crank *e*—remains always the same, and the swinging end of said arm is consequently raised and lowered, carrying the rake with it, as desired. By this means the rake is caused to discharge the grain from the platform, depositing it at its inner side or end, behind the main frame and carrying-wheels, and out of the way of the machine and horses on the next round. It is then raised, and carried back through a curved path, and out of the way of the falling grain, until it again descends upon the platform in proper position for the removal of the grain therefrom, as before.

E is the driver's seat, represented broken away in part in Fig. 4, for the purpose of showing the rake-driving gear.

The improvements hereinabove described, so far as they relate to the automatic rake and to the adaptation of the machine for use for reaping, are covered by another division of this application of even date herewith.

What is claimed herein, and sought to be secured by Letters Patent, is—

1. A main frame mounted on two main carrying-wheels, in combination with a laterally-projecting finger-bar arranged in rear of the axis of the drive-wheel, and propelled or drawn forward over the ground by a hinge-connection with the main frame at its inner or heel end only.

2. In combination with the main frame of a two-wheel rear-cut machine, a laterally-projecting finger-bar, connected with the main frame, and drawn forward over the ground by hinges in front and rear of the main drive-wheel axle.

3. An inclined or oblique brace, W, to the hinged finger-bar, located between the main carrying-wheels.

4. A hinged finger-bar, in combination with a hinged brace, to assist in propelling said finger-bar, arranged underneath and crossing the main drive-wheel axle.

5. Varying the height of the inner end of the finger-bar to adapt the machine to mowing or reaping, as desired, by the adjustment of the propelling hinges.

J. H. MYERS.

Witnesses:
W. A. A. McKINLEY,
WM. J. BURNS.